US010421140B2

(12) United States Patent
Volpi et al.

(10) Patent No.: US 10,421,140 B2
(45) Date of Patent: Sep. 24, 2019

(54) DEVICE FOR THREADING THE WIRE ELECTRODE OF A WIRE ELECTRICAL DISCHARGE EROSION MACHINE

(71) Applicant: Agie Charmilles SA, Losone (CH)

(72) Inventors: Franco Volpi, Tegna (CH); Karl Tobler, Maggia (CH); Renato Rota, Losone (CH)

(73) Assignee: AGIE CHARMILLES SA, Losone (CH)

( * ) Notice: Subject to any disclaimer, the term of this patent is extended or adjusted under 35 U.S.C. 154(b) by 409 days.

(21) Appl. No.: 15/421,451

(22) Filed: Feb. 1, 2017

(65) Prior Publication Data
US 2017/0216946 A1 Aug. 3, 2017

(30) Foreign Application Priority Data

Feb. 2, 2016 (EP) .................................. 16 153 760

(51) Int. Cl.
*B23H 7/10* (2006.01)
*B65H 57/00* (2006.01)
(52) U.S. Cl.
CPC ........... *B23H 7/102* (2013.01); *B65H 57/003* (2013.01); *B65H 2701/36* (2013.01)
(58) Field of Classification Search
CPC ..... B23H 7/102; B65H 7/003; B65H 2701/36
See application file for complete search history.

(56) References Cited

U.S. PATENT DOCUMENTS

| 4,495,393 A |   | 1/1985  | Janicke    |           |
|-------------|---|---------|------------|-----------|
| 4,814,572 A | * | 3/1989  | Aso ........................ | B23H 7/102 |
|             |   |         |            | 219/69.12 |
| 5,057,663 A | * | 10/1991 | Kinoshita ............. | B23H 7/102 |
|             |   |         |            | 219/69.12 |

FOREIGN PATENT DOCUMENTS

| CH | 650962 A5 | 8/1985 |
| DE | 3236263 A1 | 4/1983 |
| EP | 233297 A1 | 8/1987 |
| EP | 2564967 A1 | 3/2013 |
| EP | 2839917 A1 | 2/2015 |
| JP | 01205930 A | 8/1989 |
| JP | 2012206187 A | * 10/2012 |
| WO | WO 2009157205 A1 | 12/2009 |

\* cited by examiner

*Primary Examiner* — Geoffrey S Evans
(74) *Attorney, Agent, or Firm* — Leydig, Voit & Mayer, LTD.

(57) ABSTRACT

A threading nozzle for threading a wire electrode for a threading device in a wire electrical discharge erosion machine includes a threading-nozzle body having a guide bore configured to guide the wire electrode along a longitudinal axis of the former and a gap that splits the threading-nozzle body in two parts which are connected at a flexural hinge configured in the threading-nozzle body. The gap splits the guide bore in two parts.

12 Claims, 5 Drawing Sheets

DEVICE FOR THREADING THE WIRE ELECTRODE OF A WIRE ELECTRICAL DISCHARGE EROSION MACHINE

CROSS REFERENCE TO RELATED APPLICATIONS

Priority is claimed to European Patent Application No. 16 153 760.0, filed on Feb. 2, 2016, the entire disclosure of which is incorporated by reference herein.

FIELD

The present invention relates to a device for threading a wire electrode in the operating space of a wire electrical discharge erosion machine.

BACKGROUND

Wire electrical discharge erosion machines are typically equipped with a device for automatic threading of the wire electrode. An automatic threading device enables complete machining to be carried out in an unsupervised manner. A device of this type is thus of highly substantial significance for wire electrical discharge erosion machines.

The new wire electrode is drawn off from a wire spool and automatically transported through the operating space, and from there subsequently conveyed to the wire disposal. In the operating space, the wire electrode is tensioned between the upper wire-guiding head and the lower wire-guiding head, and is guided in a highly accurate manner. As the wire electrode is introduced the difficulty lies in that in general there must be no threading nozzle or other auxiliary guiding means in the region between the upper and the lower wire-guiding head, because this region has to be free for the relative movements between the workpiece and the electrode. Matters are complicated in that threading in some instances has to be carried out across significant heights of 200 mm and more, that wire electrodes having dissimilar diameter are employed, that the wire electrodes may have dissimilar rigidity, in particular dissimilar wire curvature, or that the wire electrode in the case of a very small diameter displays a thread-like behaviour wherein the wire adheres to guide faces, for example, that dissimilar dielectrics are employed, that at times threading has to be carried out into the existing cutting gap or into a start hole, that the workpiece may have stepped regions, etc.

Wire electrical discharge erosion machines are rarely employed across the entire application spectrum. In any case, the requirements to be met by the wire electrical discharge erosion machine as well as by the automatic threading device are becoming increasingly more demanding in general. In certain application fields there is the requirement for being able to thread into increasingly smaller start holes. While the classic threading jet of water or another fluid that is built up in the wire-guiding head remains the preferred solution in the standard case, the former does meet its limits here. Said threading jet is becoming increasingly unsuitable for the ever smaller start holes, since ever less space remains between the wire and the start hole. A number of solutions have already been proposed in order for this situation to be improved.

In the case of one known threading device according to CH650962, the upper wire-guiding head is guided to the start hole on the workpiece surface, wherein the wire-guiding head in the lower region is provided with a seal such that the wire-guiding head and the workpiece form a pressurized chamber. During the threading procedure the wire will thus be forced to take the path through the start hole, for example. This method is indeed highly effective but may be applied only under ideal conditions. For example, a threading device of this type fails when threading has to be carried out on the periphery of a workpiece or in a stepped region.

The primary tasks of the wire-guiding heads lie in guiding the wire electrode, transmitting the current pulses to the wire, and ensuring purging of the spark gap. The means required therefor should lie as close as possible to the workpiece in order for the best machining results to be able to be achieved. All further tasks, including threading of the wire, are subordinate thereto. To this extent, the improvement potential within the wire-guiding head is limited.

In the case of one further known threading device the wire prior to threading is stretched and severed ahead of the upper wire-guiding head such that the wire is aligned and has a tapered tip. The wire, by means of a closed tubular guide, is guided through the upper wire-guiding head up to the workpiece. The wire thus cannot escape here, and may be reliably threaded. It is disadvantageous in this solution that the wire guide, in order for the tubular guide to be applied, has to be opened or moved, respectively. This requires a special construction of the wire guide, which is expensive and complex since very high requirements are set for the accuracy of the wire guide.

In the case of a solution as is published in EP233297, an external nozzle, composed of two parts, is guided so as to be directly on the upper wire-guiding head, so as to generate a thin threading jet. The external nozzle during machining is in a resting position above the operation region, and is only moved into the threading-operation position while the wire electrode is being set up. However, the fluid jet that may be generated is still relatively thick and moreover rather weak, since there is only little available space for this split threading nozzle.

In the case of a solution according to WO2009157205, an external nozzle that is split in two is likewise guided so as to be directly on the upper wire-guiding head, wherein positioning is performed by means of a pneumatic cylinder, and the two nozzle halves are activated, that is to say opened and closed, by means of a separate drive.

In order for the exact location and position of the nozzle halves relative to one another to be ensured, geometrical features in the form of channels and protrusions are provided on the nozzle halves. In a similar solution according to EP2564967, an external nozzle that is split in two is likewise guided so as to be directly on the upper wire-guiding head, wherein the two halves are held in the open position by means of a spring; the external nozzle is actively closed by moving the external nozzle from the resting position to the operating position and to a detent on the wire-guiding head. In the two last-mentioned cases, the nozzle that is split in two is carried by a solid motion device for moving the jet nozzle between a resting position remote from the wire-guiding head to an operating position contacting the wire-guiding head.

In the case of a solution according to DE3236263A1, a movable guide-tube assembly is guided to the upper wire-guiding head and is aligned with the wire. The wire electrode is pushed into the guide-tube assembly, and the guide-tube assembly per se is guided into the start hole. The wire electrode is pushed further forward and guided into the lower wire-guiding head. Finally, the guide-tube assembly which is provided with a longitudinal slot by way of lateral movement is removed from the guide region.

In the case of a solution according to EP2839917, a movable guide-tube assembly is guided to the upper wire-guiding head. The wire electrode exits the upper wire-guiding head at a slight inclination, and is guided into the guide-tube assembly and into the start hole. The slight inclination guarantees that the wire electrode follows the guide-tube assembly.

With the exception of CH650962, all mentioned solutions are external threading devices. In this context, external means that this device during the normal erosive operation lies outside the wire-guiding head and is moved into the wire-guiding region below the wire-guiding head only during the threading procedure. The reasons for which this threading device is externally disposed include the following: (1) in the case of high requirements, that is to say of small start holes and thin wires, the threading nozzle has to be disposed so as to be very close to the workpiece; however, this space during the erosive operation is also required by the purge nozzle, the wire guide, the power supply, etc, and (2) for "standard" requirements in wire threading, that is to say with start holes >1 mm, a classic threading nozzle integrated in the wire-guiding head suffices; a special threading nozzle for advanced requirements is thus preferably to be seen as an option.

The quality of the threading device may be evaluated in particular by means of the reliability of threading the wire electrode, the duration of the threading procedure, the minimum start hole diameter at which threading may be reliably performed, and the minimum wire diameter that may be reliably threaded.

The installations mentioned above are to some extent very complex and thus expensive. In the case of the minimum start hole diameter and of the minimum wire diameter, the limits are defined by the respective construction.

SUMMARY

In an embodiment, the present invention provides a threading nozzle for threading a wire electrode for a threading device in a wire electrical discharge erosion machine. The threading nozzle includes a threading-nozzle body having a guide bore configured to guide the wire electrode along a longitudinal axis of the former and a gap that splits the threading-nozzle body in two parts which are connected at a flexural hinge configured in the threading-nozzle body. The gap splits the guide bore in two parts.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention are intended to alleviate the above-mentioned issues by providing a reliable, simple, and cost-effective threading device for fine wire electrodes.

Figure 3:
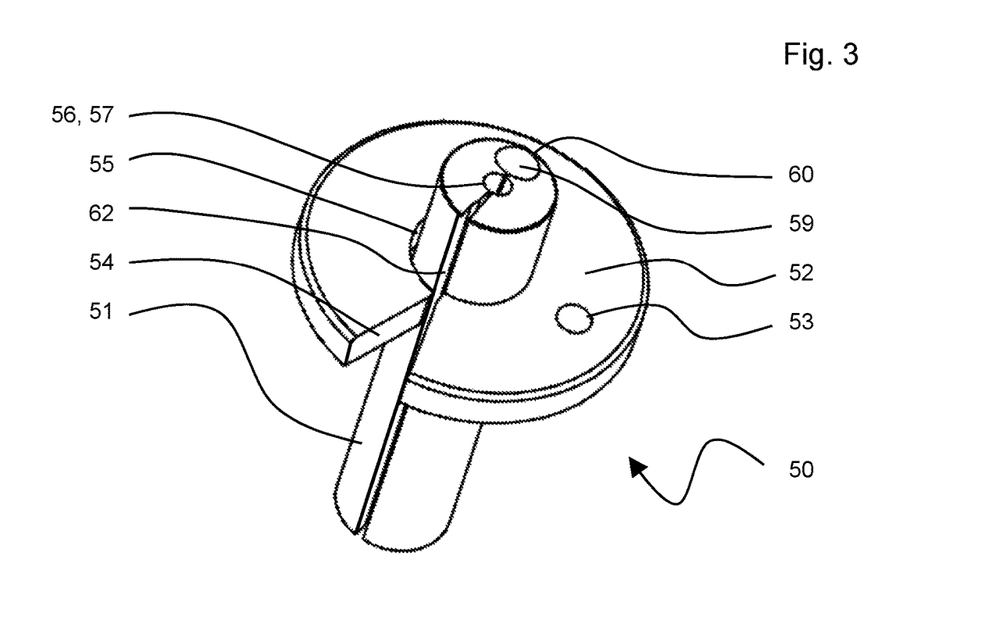
FIG. 3 shows a spatial illustration of a threading nozzle according to an embodiment of the invention from above.
Figure 4:
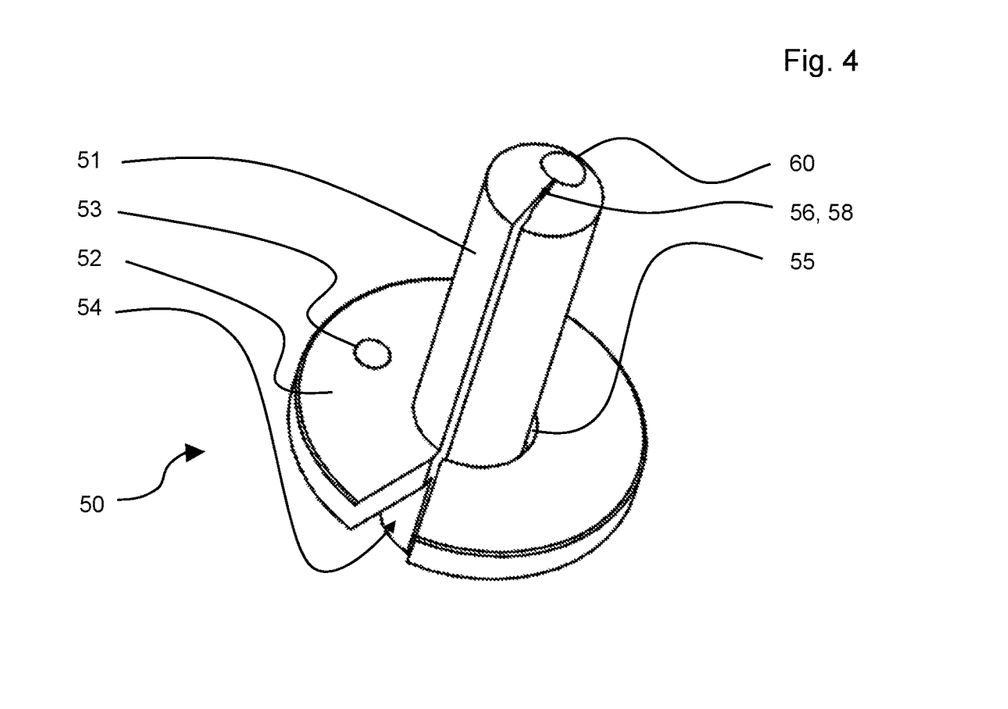
FIG. 4 shows a spatial illustration of a threading nozzle according to an embodiment of the invention from below.

In embodiments of the invention, during the threading procedure of the wire electrode, guiding an external threading device on the upper wire-guiding head from the upper wire-guiding head, through the operating space, to the lower wire-guiding head of the wire electrical discharge erosion machine. To this end, an embodiment of the invention (as shown in FIGS. 3 and 4) includes a threading device 30 that comprises a threading nozzle 50 which is composed of a threading-nozzle body 51 having a guide bore 56 for guiding the wire electrode 2 to be threaded, and a gap 62 along the entire longitudinal axis of the threading-nozzle body 51, wherein the guide bore 56 is split in two parts by the gap 62, and wherein a flexural hinge 60 is configured in the threading-nozzle body 51. The flexural hinge 60 connects the threading-nozzle body 51 which otherwise is split in two by the gap 62. The flexural hinge is generated by a material thin place in the threading-nozzle body, for example by a threading-nozzle body bore that runs through the threading-nozzle body along the longitudinal axis of the latter, and is disposed close to the cylindrical surface of the threading-nozzle body. By way of the elastic deformation of the flexural hinge 60, that is generated by means of a force acting thereon, the two halves of the threading-nozzle body 51 that is virtually split in two may be moved from an open position, formed by the gap 62, to a closed position. If the force acting thereon is cancelled, the two halves of the threading-nozzle body 51 that is split in two return to the open position of said two halves, that is to say to the resting position. By closing the threading nozzle 50, the two halves of the threading-nozzle body 51 come to lie flush on top of one another, on account of which a closed guide bore 56 is formed from the guide bore 56 that in the resting position is split in two. The threading nozzle according to an embodiment of the invention is very compact, comparatively cost effective, and nevertheless highly accurate.

The threading nozzle 50 is preferably composed of an elongate cylindrical threading-nozzle body 51 and of a threading-nozzle plate 52 which is disposed on the circumference of the threading-nozzle body 51. The preferably monolithic threading nozzle 50 is fitted to a threading-nozzle support 33 of the threading device 30 by means of the threading-nozzle plate 52. The threading-nozzle plate 52 is preferably plate-shaped but may also be of another design.

As mentioned, the threading nozzle 50 according to an embodiment of the invention comprises a guide bore 56, a gap 62 along the guide bore 56, and a flexural hinge 60, wherein these three elements extend across the entire length of the threading-nozzle body 51.

The flexural hinge 60 is preferably implemented as follows. (see figures): A threading-nozzle body bore 59 is incorporated so as to be close to the periphery of the threading-nozzle body 51 and so as to be parallel with the longitudinal axis of the threading-nozzle body 51 and so as to be connected to the gap 62 such that the guide bore 56 is split in two by the gap 62, the latter subsequently falling into this threading-nozzle body bore 59. A separation cut 55 is incorporated between the threading-nozzle plate 52 and the threading-nozzle body 51 (see FIGS. 4, 5, and 6), wherein this separation cut 55 leads around one half of the threading-nozzle body 51, from the gap 62 at least up to the region of the threading-nozzle body bore 59. In this way, the two halves of the threading-nozzle body 51 are connected only by way of the flexural hinge 60.

The flexural hinge 60 blocks all degrees of freedom of movement with the exception of a rotary degree of freedom of movement. Thus, by compressing at least one of the two halves of the threading-nozzle body 51 in relation to the other half, the gap 62 may be closed, wherein an accurate closed guide bore 56 is created. The threading device 30 according to an embodiment of the invention does not require any further geometric features for accurately mating the two halves of the threading-nozzle body 51, since the flexural hinge is intrinsically highly accurate.

The threading device 30 according to an embodiment of the invention is a device that is separate from the upper and the lower wire-guiding head. Therefore, the threading device 30 according to an embodiment of the invention is designed so as to be movable, that is to say that the former may, for example, be pivoted in a controlled manner from a resting position to an operating position and back. The resting position is a position in which the workpiece may be machined by the threading device according to an embodiment the invention without being limited or compromised, respectively, by the upper and the lower wire-guiding head.

The threading device according to an embodiment of the invention is designed so as to be movable, that is to say that the former may, for example, be pivoted in a controlled manner from a resting position to an operating position and back. The resting position is a position in which the workpiece may be machined by the threading device according to an embodiment of the invention without being limited or compromised, respectively, by the threading device. The entire threading device herein is preferably located above the workpiece plane. The threading device 30 is particularly preferably fitted to the quill. The operating position or the threading-operation position, respectively, is an unequivocal position of the threading device 30 in relation to the upper wire-guiding head, said position being preferably defined by a mechanical detent. The threading nozzle 50 or the guide bore 56, respectively, is preferably disposed so as to be precisely perpendicular to the workpiece plane. The movement between the resting position and the operating position is preferably performed by a simple uniaxial movement, for example by a pivoting movement which may be achieved by means of a gear wheel, a bell-crank lever, or other transmission means, for example. A simple drive member, for example a pneumatic cylinder having a return spring mechanism, suffices for activating the threading device.

A pivoting movement is preferably conceived in such a manner that the threading device 30 is pivoted beyond the reversal point of the pivoting movement, wherein the threading nozzle 50 is guided towards the threading-operation position onto the upper wire-guiding head. By pivoting beyond the reversal point, the last part of the pivoting movement of the threading device 30 comprises an upward movement component. Herein, the threading device 30 is moved into the direct proximity of or onto the upper wire-guiding head.

The threading device according to an embodiment of the invention offers a universal solution which may be used for various wire-guiding heads. Said solution may also be retrofitted to already existing machines. To this end, existing wire-guiding heads need not necessarily be redesigned. The complexity pertaining to the integration of a more universal threading function is thus dispensed with.

Figure 1:
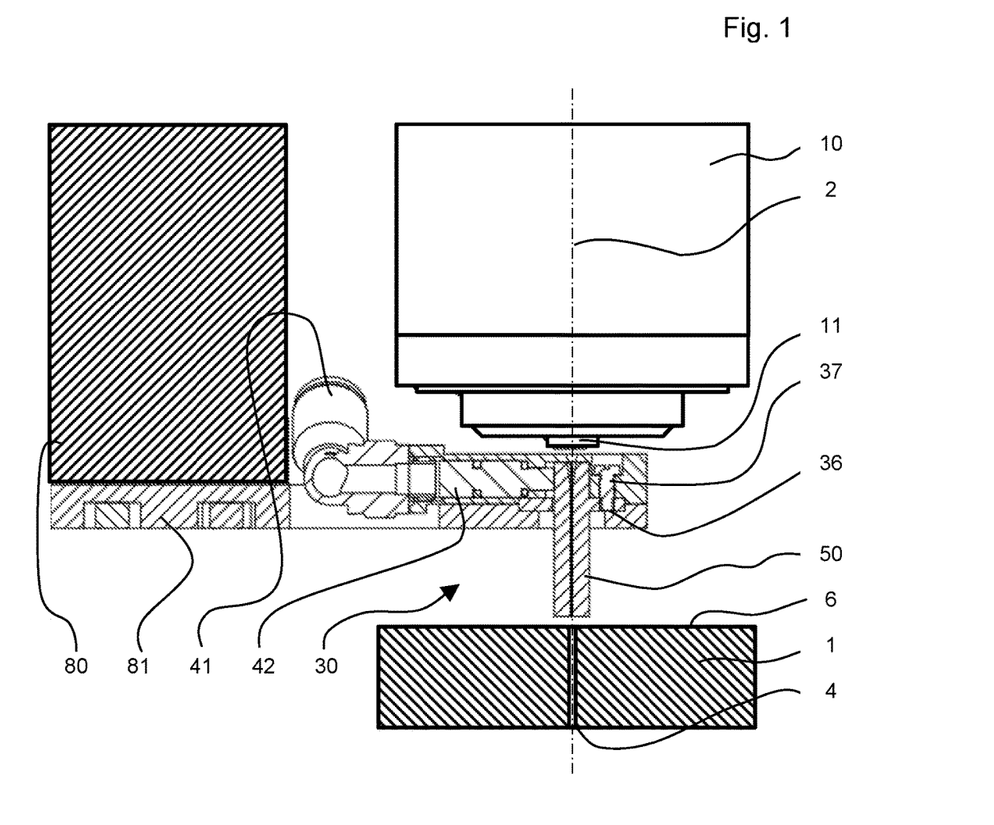
FIG. 1 shows a threading device according to an embodiment of the invention during threading in a start hole.

FIG. 1 shows a variant of the threading device 30 according to an embodiment the invention, in the threading-operation position, during threading of the wire electrode in a small start hole 4 in the workpiece 1. The threading device 30 herein is positioned in front of the upper wire-guiding head 10; the threading device 30 preferably bears directly on the front side of said upper wire-guiding head 10. The threading device 30 by means of a connector piece 81 is fitted to a pivoting installation 80.

Figure 2:
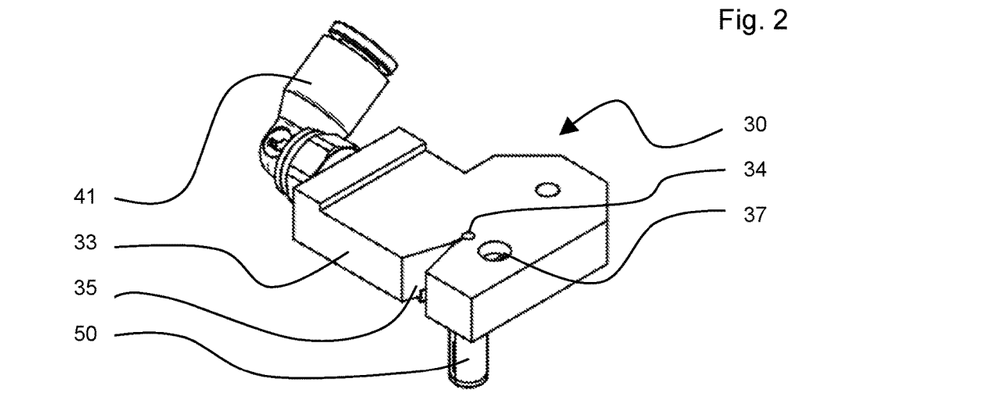
FIG. 2 shows a spatial illustration of a threading device according to an embodiment of the invention.

FIG. 2 shows the entire threading device 30 of FIG. 1, without the pivoting installation, so as to be detached from the wire electrical discharge erosion machine.

FIGS. 3 to 7 show preferred embodiments of the threading nozzle 50. The threading device 30 is composed inter alia of a threading-nozzle support 33 for receiving the threading nozzle 50. To this end, the threading-nozzle support 30 comprises a precise bearing face 36 (see FIG. 1) on which the threading-nozzle plate 52 is fitted. The position of the threading nozzle 50 on the threading-nozzle support 33 is secured by means of a dowel pin (not depicted) and a screw 37. The dowel pin is fixedly fitted to the threading-nozzle support 33; the positioning bore 53 in which the aforementioned dowel pin is inserted is provided on the threading-nozzle plate 52. Furthermore, a threaded bore 61 for fastening the threading nozzle 50 to the threading-nozzle support 33 is provided on the threading-nozzle plate 52, such that the threading nozzle 50 may be readily replaced if required. The position of the threading-nozzle support 33 is preferably adjustable such that the threading nozzle 50 may be positioned so as to be precisely aligned with the upper wire-guiding head.

The threading device 30 furthermore comprises a pressure piston 42 (see FIG. 1) which in relation to the wire-running direction is guided in the normal in the threading-nozzle support 33, acting laterally on the threading nozzle 50. Compressed air for activating the pressure piston 42 is supplied by way of the pressure-line connector 41. When compressed air is supplied, the pressure piston 42 is pressed onto the threading nozzle 50, closing the gap 62 and the guide bore 56. Compressed air is discharged in order for the gap 62 to be opened, such that the pressure piston 42 is returned to the resting position by a compression spring (not depicted) that acts counter to the compressed air. Alternatively, returning the pressure piston 42 may likewise be performed pneumatically by way of a second pressure line.

Instead of the pressure piston 42, other movement means are of course also conceivable.

The threading-nozzle support 33 on the upper side has a preferably funnel-shaped support entry 34 (see FIG. 2) through which the wire electrode 2 may reach into the threading nozzle 50 lying below said support entry 34. A support exit 35 is provided on one side of the threading-nozzle support 33, so as to correspond to the gap 62, such that the threading device 30 upon termination of the threading procedure may be pivoted out from the clamped wire electrode 2.

The threading nozzle 50 (cf. FIGS. 3 and 4) is the core element of the threading device 30 according to an embodiment of the invention. Said threading nozzle 30 is composed of a threading-nozzle plate 52 and an elongate threading-nozzle body 51. The threading-nozzle plate 52 serves substantially for accurately positioning and fixing the threading-nozzle body 51, and for accurately fitting the threading nozzle 50 to the threading-nozzle support 33, and of course for closing the gap 62 in the case of a corresponding lateral force acting thereon.

Figure 5:
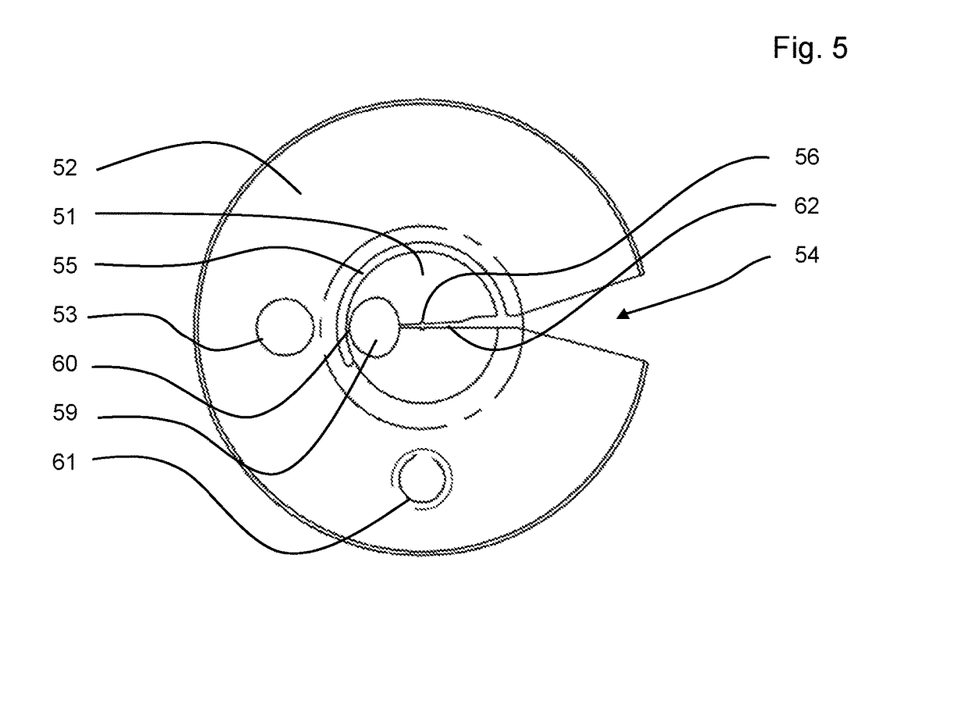
FIG. 5 shows a view from below onto a threading nozzle according to an embodiment of the invention.
Figure 6:
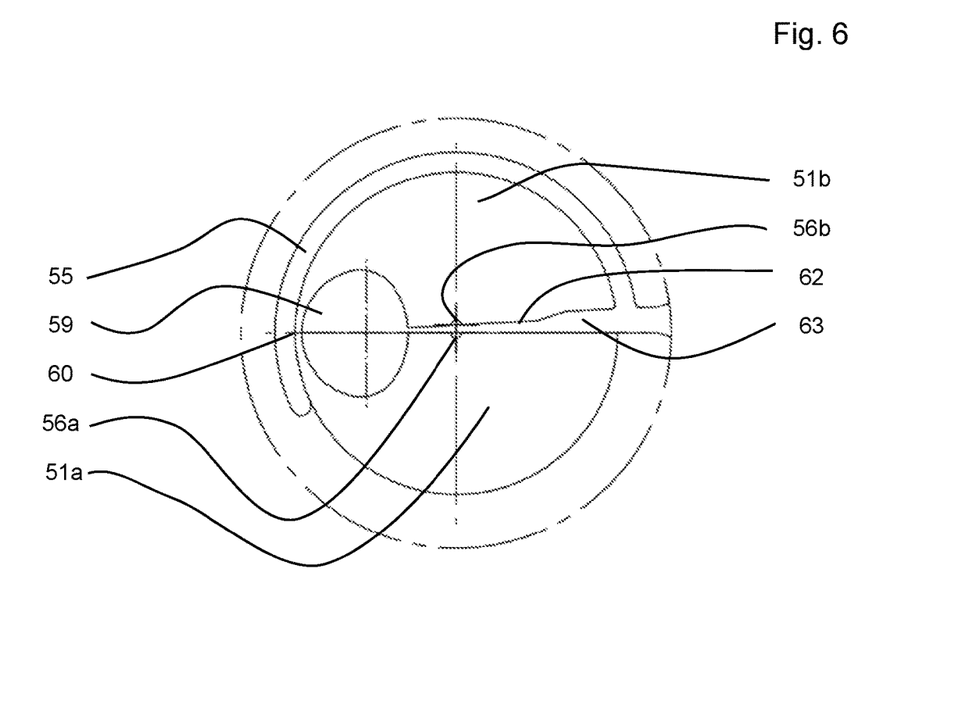
FIG. 6 shows a view of a detail of the threading nozzle of FIG. 5.
Figure 7:
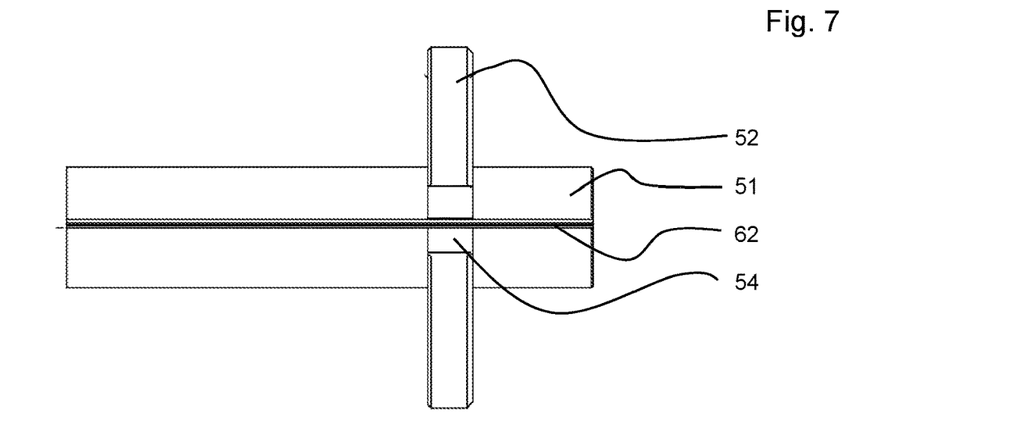
FIG. 7 shows a side view of a threading nozzle according to an embodiment of the invention.

The particular features of the threading-nozzle body 51 are best seen in FIGS. 5 and 6. The guide bore 56 which traverses the entire threading-nozzle body 51 is incorporated in the centre of the threading-nozzle body 51. The guide bore 56 during operation of the threading device 30 serves for precisely guiding the wire electrode 2 and for forming the usual threading jet. The threading-nozzle body 51 by way of a gap 62 which is incorporated across the entire height is almost completely split in two halves. The guide bore 56 is split in two by the gap 62.

A threading-nozzle body bore 59 is incorporated in the external region, close to the periphery of the threading-nozzle body 51, so as to be parallel with the gap 62 or with the longitudinal axis, respectively, and likewise across the entire length of the threading-nozzle body 51. A separation cut 55 which leads around one half of the threading-nozzle body 51, from the gap 62 up to preferably beyond the threading-nozzle body bore 59, is incorporated between the threading-nozzle plate 52 and the threading-nozzle body 51. Thus, one half of the threading-nozzle body 51, with the exception of a remaining material thin place 60, is completely separated from the other half and from the threading-nozzle plate 52. On account thereof, the flexural hinge 60 is created on the threading-nozzle body 51 in the region of the threading-nozzle body bore 59.

As is generally known, flexural hinges have a few highly interesting properties; in particular, the former are free of play, and almost free of friction and wear. Moreover, said flexural hinges may operate without damage in a humid and contaminated environment. The limited deformation, that is to say the permissible pivoting angle, is disadvantageous; however, this disadvantage herein is irrelevant because only a small movement is required in order for the threading nozzle 5 to be able to move out of the threaded wire electrode. The flexural hinge 60 preferably extends across the entire length of the threading-nozzle body 51, this having a positive effect on the torsional rigidity of the flexural hinge. The threading nozzle according to an embodiment of the invention may be moved from an open position to a closed position in that the two halves 51a and 51b of the former are converged by way of a slight rotation about the flexural hinge 60, on account of which the gap 62 is closed and the guide bore is thus formed. The wire electrode 2 may be accurately threaded in this closed position.

The guide bore 56 is created by joining or closing, respectively, the two halves 51a and 51b of the threading-nozzle body 51. The guide bore 56 preferably has a circular cross section. The guide bore 56 by way of the two halves 51a and 51b of the threading-nozzle body 51 is preferably split such that both cutting faces of the gap 62 split the guide bore 56 in two semi-circular contours 56a and 56b (see FIGS. 5 and 6). However, a guide bore 56 according to an embodiment of the invention may also be of another design: for example, a V-shaped opening may be incorporated on a face of the gap 62, no machining being incorporated on the opposite face at all. On account thereof, a guide bore that is triangular in the cross section is created when the two halves are closed.

The threading nozzle according to an embodiment of the invention or the guide bore 56, respectively, is preferably adapted to a specific wire diameter or wire-diameter range. The diameter of the guide bore 56 herein is preferably not much larger than the diameter of the wire electrode 2 (cf. FIG. 7).

Figure 8:
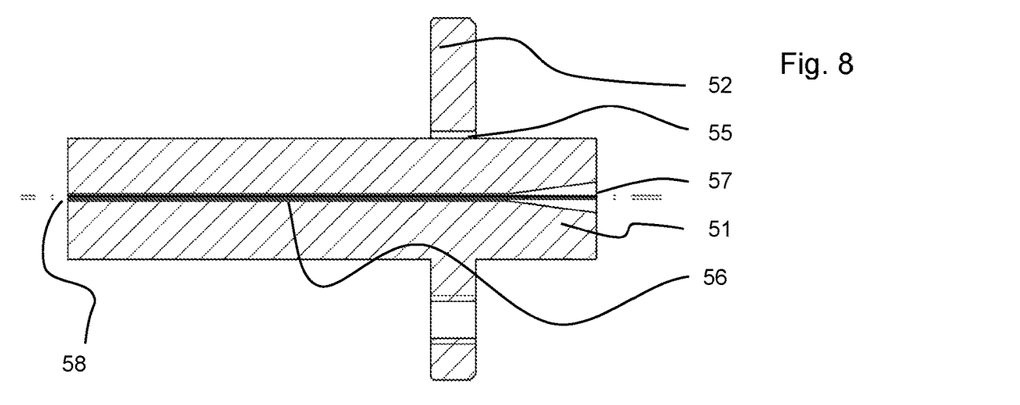
FIG. 8 shows a sectional view of a threading nozzle according to an embodiment of the invention.
Figure 9:
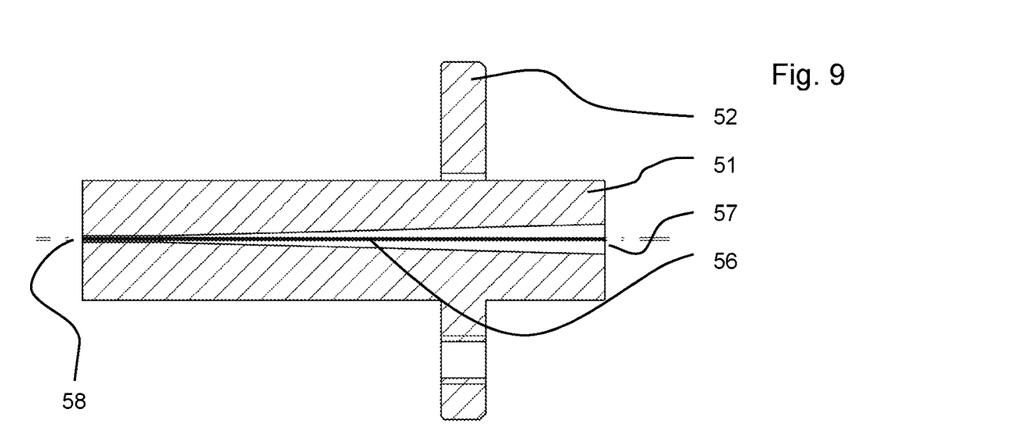
FIG. 9 shows a sectional view of a threading nozzle according to an embodiment of the invention.

The entry 57 of the guide bore 56 is preferably designed so as to be conical or funnel-shaped, respectively, so as to facilitate the introduction of the wire 2 into the threading-nozzle body 51 (see FIGS. 8 and 9). By contrast, the exit of the guide bore is preferably sharp-edged. The lower face of the threading-nozzle body 51 is preferably planar but may also be configured so as to be conical. Alternatively, the lower face of the threading-nozzle body 51 has a small stud (not depicted) of which the diameter is smaller than the start hole on the workpiece. The threading nozzle 50 during the threading procedure may be moved towards the workpiece such that the stud of the threading-nozzle body 51 may be guided into the start hole.

The guide bore 56 may at best comprise a plurality of conical portions of dissimilar rigidity. The conical portion (FIG. 8) may extend across part or across the entire length (FIG. 9) of the guide bore 56.

Figure 10:
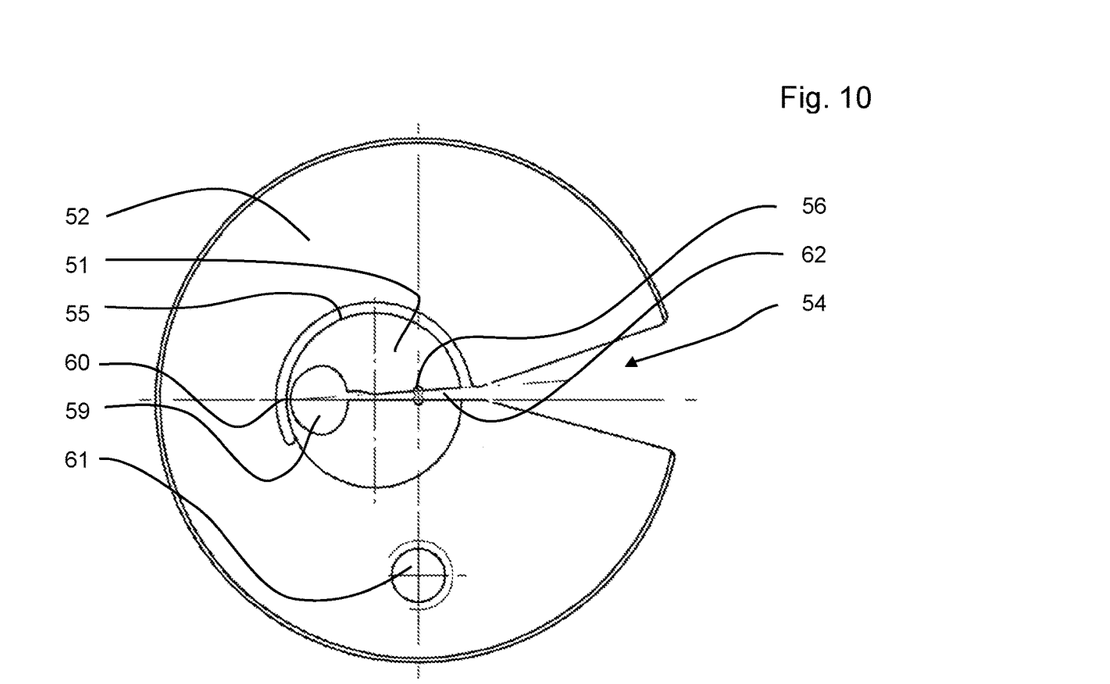
FIG. 10 shows a view from below onto a threading nozzle according to an embodiment of the invention.

The guide bore 56 may also be incorporated so as to be offset in relation to the centre of the threading-nozzle body 51, such as can be seen in FIG. 10, for example.

Figure 11:
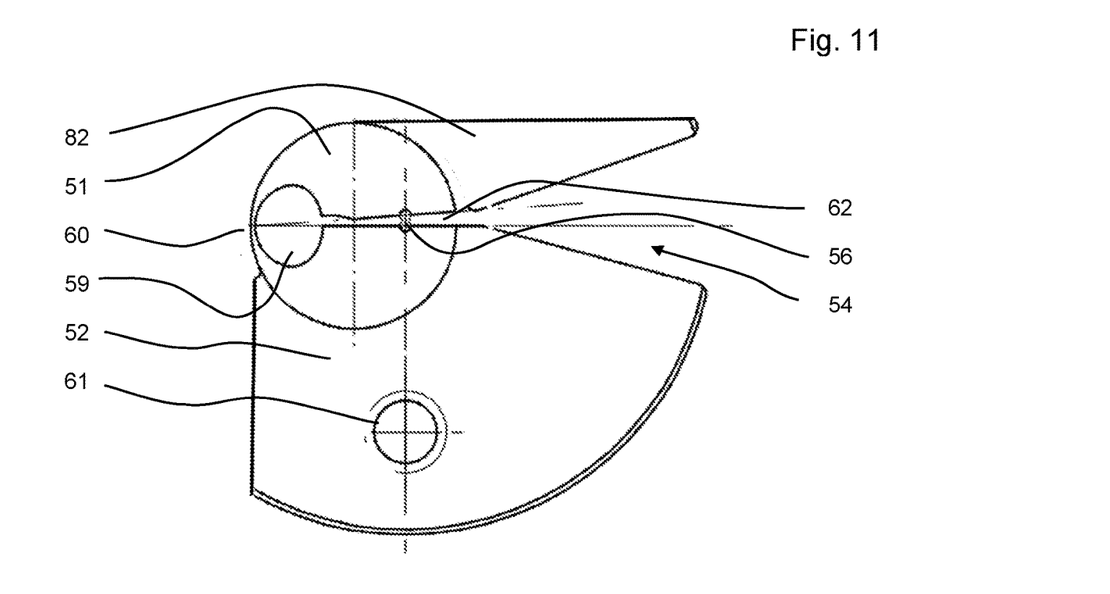
FIG. 11 shows a view from below onto a further threading nozzle according to an embodiment of the invention.

FIG. 11 shows a further embodiment of the threading nozzle 50 in which the separation cut is modified. Herein, as is the case in the earlier embodiments, part of the threading-nozzle plate 52 around the threading-nozzle body 51 in the region of the threading-nozzle body bore 59 is cut such that a flexural hinge 60 is created. The separation cut below the flexural hinge thus created is now extended such that part of the threading-nozzle plate 52 is quasi-severed. The remaining part of the threading-nozzle plate 52 suffices for the space-saving accurate positioning and fastening of the threading nozzle 50 in the region of the threading device 30.

The separation cut no longer emanates from the gap 62 but leads in a tangential manner towards the threading-nozzle body 51. In this way, a protruding lever piece 82 of the threading-nozzle plate 52 remains fastened to the threading-nozzle body 51. On account thereof, the plate exit 54 on either side continues to exist. The lever piece 82 serves for transmitting the force from the pressure piston 42 in a centric or eccentric manner; in the case of an eccentric transmission, the closing force in the region of the guide bore 56 is amplified by the lever action.

In the case of special embodiments, two guide bores of dissimilar diameter may also be present in one threading-nozzle body (not depicted). Both guide bores are split in two by the gap 62. The threading device 30 in this special case disposes of an additional translational degree of freedom, so as to position the desired guide bore in relation to the upper wire-guiding head 10.

The threading-nozzle body bore 59 may be cylindrical, oval, or have another shape. It is essential that the flexural hinge 60 has an optimal geometry, and that adequate spacing is maintained from the guide bore 56. Controlled resilience of the cutting faces of the gap 62 in the region about the guide bore 56, and thus an optimized closing behaviour, may be achieved by a special embodiment of the threading-nozzle body bore 59.

As has been mentioned, the gap 62 splits the threading-nozzle body 51 and the guide bore 56 in two. The gap starts at the periphery of the threading-nozzle body 51, falling into the threading-nozzle body bore 59. The gap 62 in the region about the guide bore 56 is just so wide that the wire electrode 2 moves out of the gap 62 without impediment in the case of an open threading nozzle.

It is important in terms of precision that the cutting faces of the gap 62 in the case of a closed threading nozzle are accurately parallel and bear cleanly on one another, in order for a completely closed guide bore 56 to be formed. Therefore, the cutting faces of the gap 62 in the case of an open threading nozzle run so as to be slightly wedge-shaped in relation to one another. In the external region of the threading-nozzle body 51 the gap 62 may additionally be provided with a gap widening 63 (see FIGS. 5 and 6). On account thereof, the cutting faces of the gap 62 better bear on one another, and the threaded wire electrode 2 may better be guided out of the gap 62.

The entire threading nozzle 50, or at least the threading-nozzle body 51, is preferably monolithic, that is to say made from a single part. The cylindrical external faces of the threading-nozzle body 51 and of the threading-nozzle plate 52 are preferably grinded or turned.

The machining operations that are essential to the functioning, in particular of the gap 62, the guide bore 56, the threading-nozzle body bore 59, the separation cut 55, and the plate exit 54 are advantageously carried out by means of wire electrical discharge erosion. The features of the threading-nozzle body herein are preferably produced "in the open state". The gap 62 is thus open in the resting state. The guide bore 56 is split in two halves; one half of the guide bore 56 is preferably incorporated on either cutting face of the gap 62. On account thereof, the relevant machining operations may be carried out in one clamping operation and with maximum precision. The entire nozzle geometry is generated in a single step, proceeding from the pre-machined cylindrical nozzle body. The sequence of the machining operations is to be observed in order for the maximum manufacturing precision to be achieved.

As has been described in the preceding paragraph, wire electrical discharge erosion is the preferred method for incorporating the essential features of the threading-nozzle body in a simple manner. Wire electrical discharge erosion is distinguished inter alia in that machining operations having an extremely high aspect ratio may be generated with high accuracy.

Alternatively, the threading nozzle 50 is at least partially machined by sinker electrical discharge erosion, or generated by means of an additive manufacturing method.

The threading device 30 according to an embodiment of the invention is disposed outside the actual wire-guiding head, and is embodied so as to be movable, preferably pivotable. Said threading device 30 is employed if and when required, either typically or else only selectively, for example in the case of difficult threading conditions. Said threading device 30 is moved into the operating position exclusively during the threading procedure, and is thus otherwise positioned in a resting position outside the operating region of the wire electrical discharge erosion machine. For the threading procedure, the threading device 30 is preferably moved directly in front of the upper wire-guiding head 10 by means of a pivoting installation 80, such that the guide bore of the threading nozzle lies coaxially with the wire-running direction of the wire electrode in the upper wire-guiding head. The threading device 30 herein does not exert any force on the upper wire-guiding head. The threading device 30 according to an embodiment of the invention thus practically forms a temporary extension of the wire-running system in the infeed region such that the tip of the wire electrode 2 from the upper wire-guiding head runs directly into the guide bore 56 according to an embodiment of the invention. The wire electrode is preferably guided through the guide bore 56 and threaded into the workpiece 1 without dielectric liquid being infed.

As an alternative to the embodiment above, in which the threading device 30 for the threading procedure is guided without force in front of the upper wire-guiding head 10, the threading device for the threading procedure may be connected to the wire-guiding head 10 in a fixed and gap-free manner, for example in a force-fitting, form-fitting, or a combined manner. Here, the wire electrode is preferably guided through the guide bore 56 and threaded into the workpiece 1 while dielectric liquid is being infed. The pressurized dielectric liquid is preferably provided in the upper wire-guiding head, particularly preferably at the integrated threading nozzle.

Upon threading the wire electrode 2 through the workpiece and through the lower wire-guiding head, the threading nozzle 50 is reopened such that the threading device 30 may be pivoted out of the now tensioned wire electrode 2 without impediment, and may be moved back to the resting position thereof. To this end, the threading nozzle 50 and threading-nozzle support 33 are of a corresponding design; the threading-nozzle body 51 comprises gap 62 and preferably a gap widening 63. The threading-nozzle plate 52, so as to correspond to the gap 62 of the threading-nozzle body 51, comprises a plate exit 54, and the threading-nozzle support 33, so as to correspond to the gap 62, comprises a support exit 35.

A few notes pertaining to the preferred dimensions and to the preferred application range of the threading device according to an embodiment of the invention are stated hereunder. It is self-evident that the embodiments of the invention are not limited to an application having these dimensions. The threading-nozzle body 51 is preferably approx. 10 to 25 mm, preferably approx. 18 mm long, having a diameter of approx. 4 mm. The threading-nozzle plate 52 has a diameter of approx. 10 to 15 mm, preferably approx. 12 mm. The threading-nozzle plate 52 is disposed in the upper region of the threading nozzle, preferably in the first third of the threading-nozzle body 51. The guide bore 56 lies preferably in the centre of the threading-nozzle body 51, but may also be offset in relation to the centre in the direction of the gap 62. In particular, the guide bore 56 in the case of threading nozzles for comparatively thick wires may be outwardly offset along the gap 62, such that said comparatively thick wires may be guided out of the gap without impediment. Said guide bore 56 may also be offset in a lateral manner in relation to the gap 62, but is at all times split by the gap 62. The diameter of the guide bore 56 in the closed state is only slightly larger than the wire electrode 2 to be threaded. The difference in diameter is less than 100 µm, preferably approx. 20 µm. The guide bore 56 and/or the entry 57 of the guide bore are/is preferably conical, having an opening angle of approx. 1° to 15°.

The two cutting faces of the gap 62 are manufactured in such a manner that the former in the case of a closed threading nozzle are mutually parallel. In the open state of the threading nozzle the two cutting faces of the gap 62 are at a mutual angle of approx. 3°, having an intersection point in the flexural hinge 60. The gap in the region of the guide bore 56 is only slightly larger than the wire electrode 2 to be threaded. The flexural hinge 60 at the thinnest point is preferably 100 μm thick, or thinner.

During the threading procedure the guide bore 56 is impinged with a pressurized dielectric liquid; the liquid pressure is approx. 3 bar.

The threading device 30 according to an embodiment of the invention may be employed with all wire electrodes, the wire electrode diameter preferably being 200 μm, or less. The threading nozzle is especially suitable for the finest wires, for example for wire electrodes having a diameter of 70 μm and less.

A special threading nozzle 50 having a correspondingly suitable diameter of the guide bore 56 is preferably provided for a specific wire electrode diameter or for a specific diameter range.

Thanks to the special configuration of the threading nozzle 50 the threading device 30 according to an embodiment of the invention may also reliably hit a start hole in this instance.

The general construction of the wire-guiding heads will now be briefly explained by means of FIG. 1. The wire electrical discharge erosion machine comprises an upper wire-guiding head 10 and a lower wire-guiding head (not illustrated). The wire electrode 2 runs by way of an infeed section of the wire drive (not illustrated) from above to the upper wire-guiding head 10, runs by way of an operating space, wherein the operating space is delimited by the upper and the lower wire-guiding head, reaches the lower wire-guiding head, and from there is drawn off to the wire disposal. During the wire-erosive machining of the workpiece 1, the wire runs off in a freely tensioned manner, at a specific wire tension and wire traveling speed, between an upper wire guide and a lower wire guide. Prior to the wire-erosive machining commencing or re-commencing, respectively, the wire electrode 2 in the operating space is threaded through the workpiece or else beside the workpiece. The tip of the wire electrode 2 lies ready in the region of the upper wire-guiding head 10, for example. Namely, this is where means for the automatic cutting of the wire electrode are typically accommodated (not illustrated).

The individual steps of the threading procedure in the case of the threading device 30 according to an embodiment of the invention being used are explained in an exemplary manner hereunder:

The machine axes are moved to the desired X and Y positions at which the wire electrode is to be threaded; the upper wire-guiding head 10 is lifted by movement of the Z axis in such a manner that the threading nozzle 50 may be positioned or pivoted inward, respectively, in front of the upper wire-guiding head 10 without contacting the workpiece 1; the pivoting installation 80 is activated, on account of which the threading device 30 is moved to the operating position directly in front of the upper wire-guiding head 10; the guide bore 56 of the threading nozzle 50 is closed by activating a pressure piston 42 on the threading-nozzle plate 52; an operating liquid (dielectric) is routed under pressure to the upper wire-guiding head 10; the wire electrode 2 is pushed forward from the upper wire-guiding head 10 by activating the wire drive and guided into the threading nozzle 50; the wire electrode 2 is guided through the threading nozzle 50 and through the workpiece 1, and is subsequently received by the lower wire-guiding head, and guided to the wire drawing-off region; the wire electrode 2 is thus threaded. The infeed of a pressure medium (for example air) to the pressure piston 42 is shut off, on account of which the threading-nozzle plate 52 and the threading nozzle 50 return to the resting positions thereof, and the gap 62 on the threading-nozzle body 51 is thus reopened; the pivoting installation 80 is re-activated so as to move the threading device 30 to a resting position; on account thereof, the open threading nozzle 50 is pivoted out from the clamped wire electrode 2; the upper wire-guiding head 10 by movement of the Z axis is adjusted downward in such a manner that the upper purge nozzle 11 comes to lie level with the workpiece plane 6; the erosive operation may now begin.

It is self-evident that a further conventional threading device, for example a threading device which by means of a nozzle integrated in the upper wire-guiding head generates a threading jet, may be employed additionally to the external threading device according to embodiments of the invention. In certain embodiments, the external threading device is an add-on or an option, respectively.

In one particular embodiment, the threading device 30 has one or two rotary degrees of freedom of movement; on account thereof, the threading nozzle 50 may be inclined, on account of which the wire electrode may also be threaded into oblique start holes.

In an embodiment of the invention, a threading nozzle 50 having a threading-nozzle body 51 which has one guide bore 56 has been illustrated by way of example, wherein the guide bore 56 is split by a gap 62 and has a flexural hinge 60.

In one alternative embodiment the threading device according to an embodiment of the invention comprises a stationary part and a movable finger which at one end by way of a flexural hinge is linked to the stationary part, and the other end of said movable finger is movable toward and away from the stationary part. A guide bore is incorporated at this second end such that the guide bore is closed upon impact of the movable finger on the stationary part.

It is self-evident that further alternative embodiments are possible, for example embodiments having two movable fingers, each having one flexural hinge. In any case, the embodiment that is illustrated in detail in the description is distinguished by a particularly compact and simple shape.

Further measures and additions which may be applied in combination with the threading device 30 according to an embodiment of the invention may be derived inter alia from the prior art mentioned at the outset.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Workpiece
2 Wire electrode, or wire, respectively
3 Wire electrode tip
4 Start hole
5 Cutting gap
6 Workpiece plane
10 Upper wire-guiding head
11 Purge nozzle
30 Threading device
33 Threading nozzle support
34 Support entry
35 Support exit
36 Bearing face for threading nozzle
37 Screw
41 Pressure-line connector
42 Pressure piston
50 Threading nozzle
51 Threading-nozzle body
52 Threading-nozzle plate
53 Positioning bore
54 Plate exit
55 Separation cut
56 Guide bore
57 Entry of guide bore
58 Exit of guide bore
59 Threading-nozzle body bore
60 Flexural hinge
61 Thread
62 Gap
63 Gap widening
80 Pivoting installation
81 Connector piece to threading-nozzle support
82 Lever piece

What is claimed is:

1. A threading nozzle for threading a wire electrode for a threading device in a wire electrical discharge erosion machine, the threading nozzle comprising:
    a threading-nozzle body having:
        a guide bore configured to guide the wire electrode along a longitudinal axis of the former, and
        a gap that splits the threading-nozzle body in two parts which are connected at a flexural hinge configured in the threading-nozzle body,
    wherein the gap splits the guide bore in two parts.

2. The threading nozzle according to claim 1, the threading nozzle further comprising a threading-nozzle plate.

3. The threading nozzle according to claim 2, wherein the threading-nozzle plate is disposed about a circumference of the threading-nozzle body, having a plate exit that exposes the gap.

4. The threading nozzle according to claim 2, wherein the threading-nozzle plate is connected to the threading-nozzle body, and
    wherein a separation cut, which at least in a region of the flexural hinge mutually separates the threading-nozzle body and the threading-nozzle plate, is incorporated in the connection region between the threading-nozzle body and the threading-nozzle plate.

5. The threading nozzle according to claim 1, wherein the threading-nozzle body has along the longitudinal axis thereof a threading-nozzle body bore which forms in the threading-nozzle body a material thin place that configures the flexural hinge.

6. The threading nozzle according to claim 1, wherein the threading nozzle is monolithic.

7. The threading nozzle according to claim 1, wherein the threading nozzle is produced by wire electrical discharge erosion.

8. The threading nozzle according to claim 1, wherein the guide bore of the threading nozzle is substantially cylindrical, having a conical entry.

9. The threading nozzle according to claim 1, wherein the gap is wedge-shaped.

10. The threading nozzle according to claim 9, wherein the gap has a gap widening.

11. A threading device for wire electrical discharge erosion machines, for threading wire electrodes from an upper wire-guiding head of a wire electrical discharge erosion machine through an operating space of the wire electrical discharge erosion machine into the lower wire-guiding head of the wire electrical discharge erosion machine, the threading device comprising:
    a threading nozzle for threading a wire electrode for a threading device in a wire electrical discharge erosion machine, the threading nozzle including a threading-nozzle body having:
        a guide bore configured to guide the wire electrode along a longitudinal axis of the former, and
        a gap that splits the threading-nozzle body in two parts which are connected at a flexural hinge configured in the threading-nozzle body,
    wherein the gap splits the guide bore in two parts.

12. The threading device according to claim 11, wherein the threading device has a threading support to which the threading nozzle is fitted by way of a threading-nozzle plate, and
    wherein the threading support furthermore has a pressure piston that may exert a compression force on the threading nozzle plate, such that parts of the threading-nozzle body that are separated by the gap are compressed, closing the guide bore that is split in two.

* * * * *